United States Patent [19]

Okumura et al.

[11] Patent Number: 4,694,891
[45] Date of Patent: Sep. 22, 1987

[54] BOILER APPARATUS UTILIZING EXHAUST GAS HEAT

[75] Inventors: Shinichi Okumura, 9, Yakumonishimachi 4-chome, Moriguchi-shi, Osaka; Yasushi Okumura, Moriguchi, both of Japan

[73] Assignee: Shinichi Okumura, Osaka, Japan

[21] Appl. No.: 944,334

[22] Filed: Dec. 18, 1986

[30] Foreign Application Priority Data

Jan. 31, 1986 [JP] Japan .................................. 61-19718
Feb. 17, 1986 [JP] Japan .................................. 61-32274

[51] Int. Cl.$^4$ .............................................. B60H 1/06
[52] U.S. Cl. .................................. 165/41; 237/12.3 R
[58] Field of Search ...................... 237/12.3 R, 12.3 B, 237/1 R; 219/202, 203, 205; 165/41

[56] References Cited

U.S. PATENT DOCUMENTS 4,562,890  1/1986  Matoba ...................... 237/12.3 R X
4,575,003  3/1986  Linker et al. .............. 237/12.3 R X Primary Examiner—Henry Bennett
Attorney, Agent, or Firm—Koda and Androlia

[57] ABSTRACT

The invention relates to a boiler apparatus and, more particularly, to a boiler apparatus for removing a deposit of frost, snow, ice, or the like on the surface of the windshield or rear window of an automobile or the like vehicle by spraying hot water to melt such deposit. The apparatus has at least one pair of heater tube and by-pass tube. The water in the tank is heated by hot exhaust gas in the heater tube and discharged as hot water from a discharge nozzle. When the water in the tank is discharged after passing through a by-pass tube, the water is not heated and discharged at its as-is temperature. The heater tube is usually disposed in a hollow tube body, and the hollow tube body, with the heater tube, is mounted to an exhaust pipe so that the exhaust gas is discharged after passing through the hollow tube body. Alternatively, it may be mounted in position integrally with the engine or muffler. For safety purposes, the heater tube may be provided with an automatic pressure discharge valve or a safety valve.

14 Claims, 7 Drawing Figures

BOILER APPARATUS UTILIZING EXHAUST GAS HEAT

BACKGROUND OF THE INVENTION

1. Field of the Invention

This invention relates to a boiler apparatus and, more particularly, to a boiler apparatus for removing a deposit of frost, snow, ice, or the like on the surface of the windshield and rear window of an automobile or the like vehicle by spraying hot water to melt such deposit.

2. Prior Art

An apparatus for fast and easy removal of a deposit of frost, snow, ice, or the like on a windshield is of great interest to persons who drive or use a car in winter time. Hence, various systems of this sort have been devised to date.

One commercially known system utilizes particular rays such as infrared or far infrared rays. Another utilizes electric heat. There is also known a system which utilizes heat of engine cooling water. In addition, one consisting of a combination of two of these systems. However, these systems each has a disvantage of its own because of which it is unable to effect fast and easy removal of frost, snow, ice, or the like depositing on the windshield.

An apparatus of the system which utilizes infrared or similar rays has a difficulty that where the snow deposits thick in layers on the windshield, rays will not reach deep into the layers of snow. One which utilizes electric heat is handy to operate, but since it depends for power supply on car batteries, the difficulty is that power available is only of the order of 120 W in the case of a medium-size car and 240 W in the case of a large-size car (when the engine is not in operation), no sufficient heat generation being expectable for melting a deposit of snow or the like. An apparatus of the type which utilized heat of engine cooling water has a drawback that considerable time is required to allow temperature rise of the cooling water, which means that the apparatus is almost useless when the engine is in a cooled-down state. More especially, when the car has been exposed to a non-use condition at a cold area for a long time, it takes much time to start the engine and, therefore, with this third mentioned type of apparatus, the loss time involved before the car begins to run will easily be doubled. Such type of apparatus would possibly become usable after the engine has been driven for more than 30 minutes, for example.

As above stated, the conventional apparatuses each has its own drawback and has not been successful in removing snow or the like by melting rapidly after engine start.

SUMMARY OF THE INVENTION

This invention is intended to overcome the difficulties with the prior-art apparatuses, and to this end it contemplates the best utilization of hot exhaust gas becoming available immediately after engine start.

Accordingly, it is an object of the invention to provide a boiler apparatus which is able to quickly melt and remove a deposit of frost, snow, ice or the like present on a windshield, a rear window, or the like in a short time after engine start.

It is another object of the invention to provide a boiler apparatus which is able to turn water quickly into hot water, of higher temperature than hot water that can be made available by any similar apparatus of the conventional type, and which is thus able to readily melt a thick layer of snow or the like.

It is a further object of the invention to provide a boiler apparatus which can use a cost free source of heat for heating water.

It is a still another object of the invention to provide a boiler apparatus which is simple in construction and inexpensive to manufacture and which can readily be mounted in automobiles.

In order to accomplish the forgoing objects, the boiler apparatus in accordance with the invention comprises a tank for storing water, a nozzle for spraying water, a two-way switchable valve provided in passage connecting between the tank and the nozzle, a pump provided in passage connecting between the tank and a supply port of the valve, at least one pair of heater tube and by-pass tube which are respectively connected at one end to respective output ports of the valve and at the other end to the nozzle. The heater tube is adapted to be heated by hot exhaust gas so that heated water is discharged from the nozzle by the action of the pump when flow passages within the valve are in communication with the heater tube. The by-pass tube is not heated; therefore, when the flow passages within the valve are in communication with the by-pass tube, water is discharged from the nozzle without being heated. The valve is preferably of solenoid type.

Since an automobile engine begins to produce hot exhaust gas immediately after it is started, it is possible to start heating the heater tube and accordingly the water therein immediately after engine start, by utilizing heat of such exhaust gas. The exhaust gas is of considerably high temperature and accordingly the water within the heater tube is heated rapidly to become hot water. When this condition is reached, the valve is switched so as to bring the flow passage within the valve into communication with the heater tube and the pump is actuated, whereupon hot water is discharged from the nozzle. The hot water can quickly melt frost, snow, ice, or the like deposit because it is of considerably high temperature.

In order to increase the quantity of discharge, aforesaid heater tube and by-pass tube may be provided in two pairs (two systems) or more.

A boiler portion for heating the heater tube comprises a hollow tube body having at least two openings, and said portion is mounted directly to an exhaust tube in a car. The heater tube is constructed in a spiral or zigzag folded form in order to provide a larger heating area and is installed within the hollow tube body, its both ends being connected at locations outside the hollow tube body to pipelines leading to the tank and the nozzle.

According to an advantageous development of the invention, the boiler portion, as a unit, may be removably mounted in position by means of joints. Through such arrangement the boiler portion may be adapted for ease of setting and replacement. For this purpose, the boiler portion has at least one heater tube of a spiral or other form housed in its hollow tube body, the both ends of the tube being located outside the hollow tube body, with joints fitted thereto. At least one pair of joints are mounted to the peripheral wall of the hollow tube body for connection with an exhaust tube. Such joints are provided preferably in two pairs so that one pair is located at the front and rear ends of the hollow tube body and the other pair on the upper and lower sides thereof in order to facilitate selection of the joints according to the positions of the exhaust gas tube and/or the space available for installation of the boiler portion.

Preferably, the hollow tube body is of a generally ellipsoidal flat disk shape in its sectional configuration so that it may be readily installed even where the space available is limited.

DETAILED DESCRIPTION OF THE INVENTION

Embodiments of the invention will now be described in detail with reference to the accompanying drawings.

Figure 1:
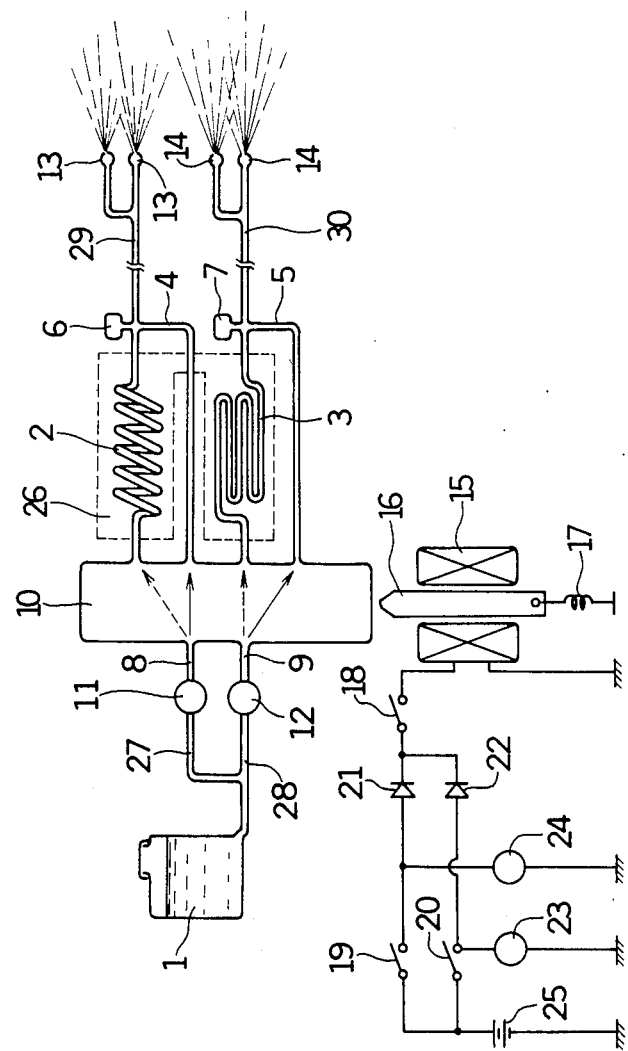
FIG. 1 is a schematic representation showing one embodiment of the invention, a generally aspect of the construction of the boiler apparatus being shown integrally with a control circuit.

FIG. 1 shows a first embodiment of the invention, in which numeral 1 designates a tank for storing water, 2, 3 designate heater tubes, 4, 5 designate by-pass tubes, 6, 7 designate automatic pressure discharge valves, 8, 9 designate solenoid valves, 10 designates a valve unit, 11, 12 designate washer pumps, and 13, 14 designate discharge nozzles. A pipeline leading from the tank 1 branches into two on its way and the two branch lines are respectively connected to the solenoid valves 8 and 9 disposed in the valve unit 10, with the washer pumps 11, 12 disposed on the respective ways of branch lines 27, 28 to the valve unit 10. The heater tubes 2, 3 are disposed in a hollow tube body 26 which constitutes a boiler portion and through which exhaust has is passed, and the by-pass tubes 4, 5 are disposed outside the hollow tube body 26. The heater tubes 2, 3 and the by-pass tubes 4, 5 are individually connected at one end to the valve unit 10, and the other ends of the by-pass tubes 4, 5 are connected respectively to the heater tubes 2, 3 at locations adjacent the other ends thereof so that the heater tubes 2, 3 are respectively in continuity relation with the by-pass tubes 4, 5. The automatic pressure discharge valves 6, 7 are respectively disposed adjacent the respective connections between the heater tubes 2, 3 and the by-pass tubes 4, 5. Said valves 6, 7 are automatically opened under the pressure within the tubes when the pressure is abnormally high, to discharge the water in the tubes, thus serving to prevent abnormal pressure rise within the tubes. The heater tubes 2, 3 are connected at the other ends thereof respectively to piplines 29, 30 leading to the discharge nozzles 13, 14, through corresponding joints.

Normally, the valve unit 10 is disposed in a seating chamber, a bonnet, or a trunk of the car. The solenoid valves 8, 9 are synchronously operated by a drive shaft 16 for solenoid coil 15. When the solenoid coil 15 is not energized, flow passages in the solenoid valves 8, 9 are in communication respectively with the by-pass tubes 4, 5 and the passages therein which lead to the heater tubes 2, 3 are in closed state. When the solenoid coil 15 is energized, the valve drive shaft 16 is elevated, whereupon the solenoid valves 8, 9 are switched over for change of flow passages so that the flow passages therein are now in communication with the heater tubes 2, 3. The passages leading to the by-pass tubes 4, 5 are then in closed condition. When the coil 15 is de-energized, the valve drive shaft 16 is lowered by the action of spring 17 to reset to its original position, whereupon the solenoid valves 8, 9 are again switched over for change of flow passages so that they go into communication with by-pass tubes 4, 5. By controlling the solenoid coil 15 in this way it is possible to change the flow passages of the solenoid valves 8, 9.

The control of the solenoid coil 15 is performed by a control switch 18 shown in the electric circuit diagram given in the lower part of FIG. 1. In this circuit diagram, 19, 20 are switches for motor control, 21, 22 are diodes for prevention of current back flow, 23, 24 are motors for driving washer pumps 11, 12, and 25 is a power source for which car batteries are used. Aforesaid switches 18, 19, 20 are disposed in a driver's cab.

Figure 3:
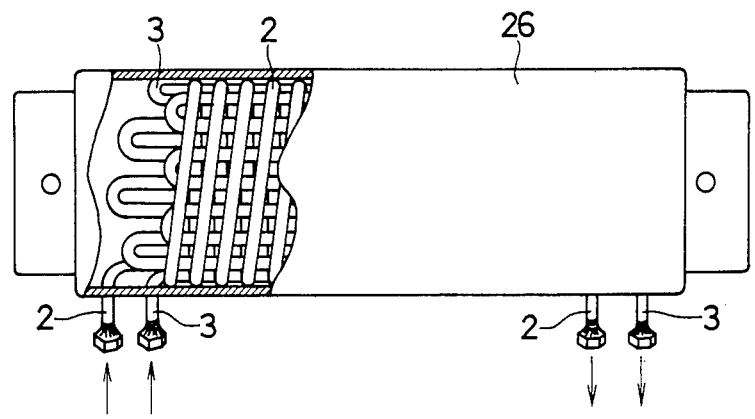
FIG. 3 is a partially cutaway plan view showing a boiler portion.
Figure 4:
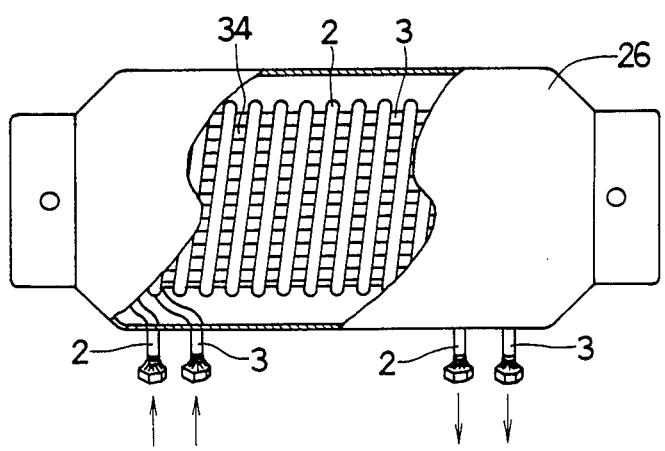
FIGS. 4 and 5 are partially cutaway plan views showing other forms of boiler portion.

FIG. 3 is an enlarged view of the boiler portion, which shows the arrangement of the heater tubes 2, 3 within the hollow tube body 26. In this embodiment, the heater tube 2 is of a spiral pattern, being mounted on the inner wall of the hollow tube body 26 in abutment therewith. The heater tube 3 is disposed in a folded zigzag pattern inwardly of the heater tube 2. The respective both ends of the heater tubes 2, 3 project outwardly from one side of the heater tube body 26. The hollow tube body 26 is mounted to the exhaust tube of the car, both ends of the former being connected to two ends of the latter formed by cutting off a portion thereof.

For the material of the heater tubes 2, 3, pipelines 29, 30, and the discharge nozzles 13, 14, it is desirable to use a heat- and acid- resistant metallic or ceramic material. Experimental results show that such components made of stainless steel withstand prolonged use.

In operation of the boiler apparatus constructed as above described, the car engine is first started, whereupon the water retained in the heater tubes 2, 3 is heated by hot exhaust gas. Now, if the control switch is left in open position, the flow passages within the solenoid valves 8, 9 in the valve unit 10 are in communication with the by-pass tubes 4, 5 respectively. Accordingly, with the motor control switches 19, 20 closed, the washing pumps 11, 12 are driven by the motors 23, 24, whereupon the water in the tank 1 is discharged from the discharge nozzles 13, 14 after passing through the by-pass tubes 4, 5. In this case, therefore, the water is not heated and discharged at as-is temperature thereof. In the case where no hot water is needed, the apparatus may be operated in this mode.

In this conjunction, it is noted that if one switch 19 only is closed, the washer pump 12 only is driven by the motor 24, the water being discharged accordingly from the discharge nozzle 14 through the by-pass tube 5. Where only a smaller amount of water discharge is required, one of the two switches 19, 20 may be closed as above noted.

If hot water is to be discharged from the discharge nozzles 13, 14, the switch 18 is closed. When the switch 18 is closed, the solenoid coils 15 are energized to displace the valve drive shaft 16 and the solenoid valves 8, 9 are switched over for change of flow passages. Thus, the pipelines 27, 28 are allowed to communicate with the heater tubes 2, 3 respectively, so that the water in the tank 1 is heated by exhaust gas in the heater tubes 2, 3, being then discharged from the discharge nozzles 13, 14. The temperature of the hot water may vary to some extent depending upon the exhaust volume of the engine, but generally it is of the order of 70°~100° C. If a smaller quantity of hot water discharge is required, one of the motor control switches 19, 20 is closed. When done so, only one of the washer pumps 11, 12 is driven, hot water in the one heater tube 2 or 3 on the driven pump side is discharged.

Aforesaid control switch 18 can be closed (i.e., turned on) to actuate the solenoid valves 8, 9 only when voltage is being applied to either one of the motors 23, 24, that is, only when water is sprayed over the windshield or rear window. The reason for this is that since the heater tubes 2, 3 are constantly exposed to heat of exhaust, the water therein is very hot, and therefore, that it is necessary to prevent the solenoid valves 8, 9 from being switched over when the washer pumps 11, 12 are not in operation, in order not to allow such hot water to flow back toward the tank 1.

Figure 2:
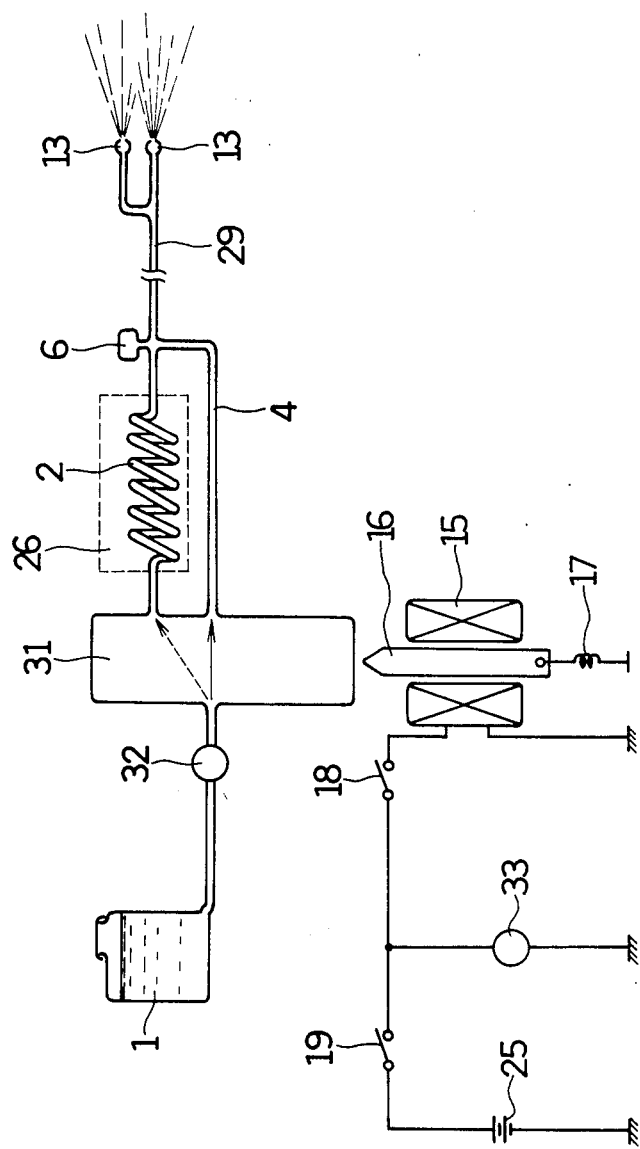
FIG. 2 is a view similar to FIG. 1 which shows another embodiment of the invention.

FIG. 2 shows a second embodiment of the invention. This embodiment comprises only one system of heater tube 2 and by-pass tube 4, with one solenoid valve 31, one washer pump 32, and one motor 33. The manner of operation is similar to the case of the first embodiment which is of two-system arrangement. It is noted, however, that in the control circuit the provision of the anti-backflow diodes 21, 22 is unnecessary, because there is no possibility of electric current backflow.

FIGS. 4 through 7 show other forms of the boiler portion. In the FIG. 4 embodiment, the heater tubes 2, 3 are disposed on the outer side of an inner tube 34 provided inside the hollow tube body 26. In this case, the heater tubes 2, 3 are not in contact with exhaust gas, since exhaust gas flows through the interior of the inner tube 34.

Figure 5:
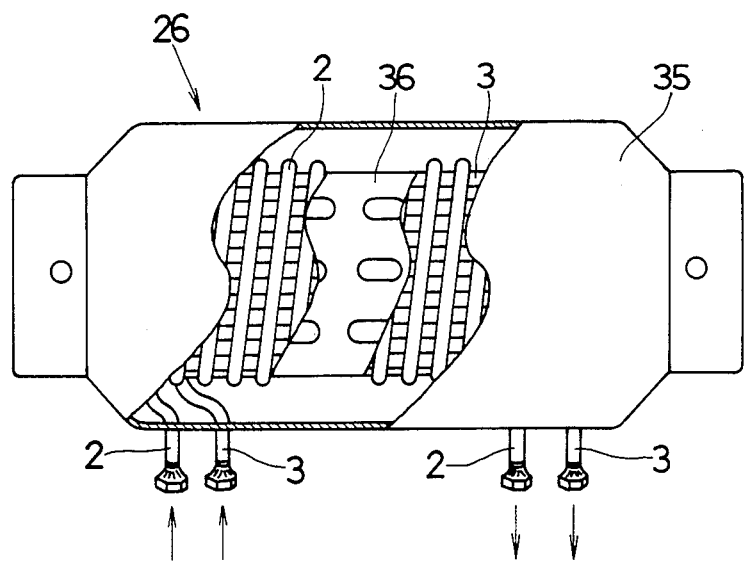

In the embodiment shown in FIG. 5, the tube body 26 is of a double construction consisting of an outer tube 35 and an inner tuber 36 disposed therein. Small holes are bored in a suitable number through the wall of the inner tube 36 through which exhaust gas will pass, and both ends of the outer tube 36 are fixed by welding to the outer wall of the inner tube 36, the heater tubes 2, 3 being disposed in a space defined between the inner and outer tubes 35, 36.

Figure 6:
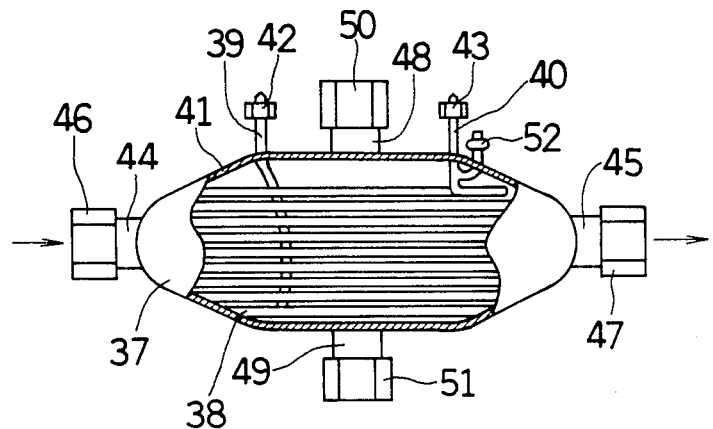
FIGS. 6 and 7 are respectively a partially cutaway front view and a plan view, both showing a general aspect of boiler portion where the boiler portion is constructed as a unit.
Figure 7:
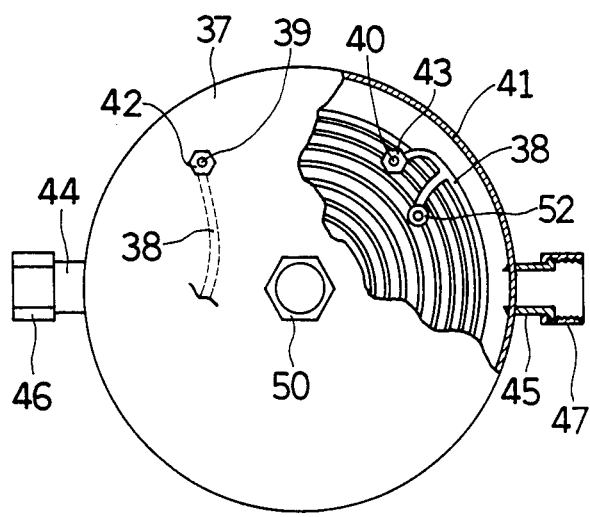

The embodiment shown in FIGS. 6 and 7 is such that the boiler portion is formed as one unit, with a heater tube 38 of a spiral configuration housed in a disk shaped hollow tube body 37 having a generally ellipsoidal sectional configuration. Both ends 39, 40 of the heater tube 38 extend through a peripheral wall 41 of the hollow tube body 37, then projecting upward.

The heater tube 38 has its adjacent portions connected together by band-fastened or spot welded at several points. The outer most portions of the heater tube 38 are fixed to the inner side of the peripheral wall 41 of the hollow tube body 37 in a similar manner. This is intended to prevent the vibration of the heater tube 38.

The portions of the peripheral wall 41 through which the heater tube 38 extends are sealed against exhaust gas leakage. Both ends 39, 40 of the heater tube 38 are fitted with joints 42, 43 for connection with pipelines leading to the discharge nozzle and the water tank.

On the peripheral wall 41 of the hollow tube body 37 and at the front and rear ends thereof there are fitted by welding joints 46, 47 including pipes 44, 45, the mounting seats thereof extending through the peripheral wall 41. On the top and bottom of the peripheral wall 41 there are centrally fitted joints 50, 51 including pipes 48, 49 in same manner as is the case with aforesaid joints 46, 47. These joints 46, 47, 50 , 51 are for the introduction and discharge of exhaust gas. Usually, these joints 46, 47, 50, 51 are used in such a way that one pair of joints 46, 47 at the front and rear ends, or one pair of joints 50, 51 at the top and bottom are fitted to the exhaust tube at the time of installation work, the other pair being plugged for nonuse. With such arrangment, either pair of the joints may be used according to the space available for installation in the vicinity of the car engine, and thus the apparatus may be mounted in various types of automobiles ranging from large-size to small-size cars.

Numeral 52 designates a safety valve connected to the heater tube 38 at a location adjacent one end 40 thereof inside the hollow tube body 37 and extending through the peripheral wall 41. The safety valve 52 is similar to the automatic pressure discharge valves 6, 7.

In this embodiment, the heater tube 38 may be comprised of a fine circular elongate tube or plate form tube made of a super heat-conductive metal material. It may be of a spiral or zigzag configuration. The provision of two systems of heater tubes 38 is also possible. Further, for the purpose of heating efficiency improvement and safety assurance, it is desirable that the outer periphery of the hollow tube body 37 should be covered with a heat insulating member.

In the above described embodiments, the heater tubes 2, 3, 38 are disposed inside the hollow tube body 26, or 37, but alternatively they may be disposed integrally with a muffler device, or may be disposed with the engine inside or outside the engine.

In the embodiments, description is centered on cases where the apparatus of the invention is applied to automoviles, but needless to say, the invention is applicable to any equipment or vehicle which can produce hot exhaust gas.

What is claimed is:

1. A boiler apparatus for removing a deposit of frost, snow, ice, or the like by melting same by discharging hot water, comprising a tank for storing water, a nozzle for spraying water, a two-way switchable valve provided in passage connecting between said tank and the nozzle, a pump provided in passage connecting between the tank and a supply port of said valve, at least one pair of heater tube and by-pass tube which are respectively connected at one end to said nozzle, said heater tube being adapted to be heated by respective output ports of the valve and at the other end to hot exhaust gas so that heated water is discharged from said nozzle when flow passages within the valve are in communication with said heater tube.

2. A boiler apparatus as set forth in claim 1, wherein said heater tube is disposed in a hollow tube body and wherein it is so arranged that exhaust gas is discharged after passing through said hollow tube body.

3. A boiler apparatus as set forth in claim 2, wherein said hollow tube body has an inner tube through which exhaust gas is allowed to pass, said heater tube being mounted to the outer periphery of said inner tube.

4. A boiler apparatus as set forth in claim 2, where said hollow tube body consists of an inner tube through which exhaust gas is allowed to pass and an outer tube, and wherein said heater tube is mounted to the outer periphery of said inner tube and are adapted to be heated by exhaust gas flowing into a closed space between the inner and outer tubes through small holes bored through the wall of the inner tube.

5. A boiler apparatus as set forth in one of claims 1 to 4, wherein there are provided two pairs of heater tube and bypass tube, one of the heater tubes being of a spiral configuration, the other being of a folded zigzag configuration.

6. A boiler apparatus as set forth in one of claims 1 to 4, wherein said valve is a solenoid valve.

7. A boiler apparatus as set forth in one of claims 1 to 4, wherein said heater is provided with an automatic pressure discharge vlave.

8. A boiler apparatus as set forth in claim 2, wherein said hollow tube body has as least one pair of joints for connection with an exhaust pipe.

9. A boiler apparatus as set forth in claim 8, wherein said joints are fitted in two pairs to the peripheral wall of said hollow tube body in different directions from each other so that the hollow tube body may be connected to an exhaust tube in different directions.

10. A boiler apparatus as set forth in claim 9, wherein said hollow tube body is of a disk shape with a generally ellipsoidal sectional configuration.

11. A boiler apparatus as set forth in claim 8, wherein said hollow tube body has a safety valve.

12. A boiler apparatus as set forth in claim 1, wherein said heater tube is mounted directly to the engine.

13. A boiler apparatus as set forth in claim 1, wherein said heater tube is disposed integrally with a muffler device.

14. A boiler device as set forth in claim 10, wherein said heater tube is housed in a spiral form in said hollow tube body.

* * * * *